United States Patent [19]

Knudson, Jr. et al.

[11] Patent Number: 4,569,923

[45] Date of Patent: Feb. 11, 1986

[54] PROCESS FOR MANUFACTURING ORGANOCLAYS HAVING ENHANCED GELLING PROPERTIES

[75] Inventors: Milburn I. Knudson, Jr., Gonzales, Tex.; Thomas R. Jones, St. Austell, England

[73] Assignee: Southern Clay Products, Inc., Gonzales, Tex.

[21] Appl. No.: 551,957

[22] Filed: Nov. 15, 1983

Related U.S. Application Data

[63] Continuation-in-part of Ser. No. 393,600, Jun. 30, 1982, abandoned, which is a continuation of Ser. No. 193,635, Oct. 3, 1980, abandoned.

[51] Int. Cl.⁴ .............................................. C09C 1/42
[52] U.S. Cl. .............................. 501/148; 106/308 N
[58] Field of Search .............................. 501/145–150; 106/308 N

[56] References Cited

U.S. PATENT DOCUMENTS

| | | | |
|---|---|---|---|
| 3,433,704 | 3/1969 | Hecklau et al. | 501/147 |
| 4,240,951 | 12/1980 | Moll et al. | 106/308 N |
| 4,371,626 | 2/1983 | Hentz | 501/145 |

Primary Examiner—Mark L. Bell
Attorney, Agent, or Firm—Stefan J. Klauber

[57] ABSTRACT

An improvement is disclosed for use in the process wherein an organophilic clay is manufactured by reacting a sodium smectite-type clay with a higher alkyl-containing quaternary ammonium compound. According to the improvement of the invention, the gelling properties of the resulting organoclay are enhanced, by subjecting the clay to high energy pugmilling prior to the reaction thereof with the ammonium compound. This is preferably effected by passing the clay at 25 to 40 weight percent moisture content, through a pugmill which imparts at least 20 HP/hrs/ton of energy to the clay, after which the clay is subjected to the prior art processing.

7 Claims, 3 Drawing Figures

EFFECT OF TREATMENT OF CRUDE BENTONITE BY HIGH ENERGY PUGMILLING. VISCOSITY MEASURED IN ODORLESS MINERAL SPIRIT GEL.

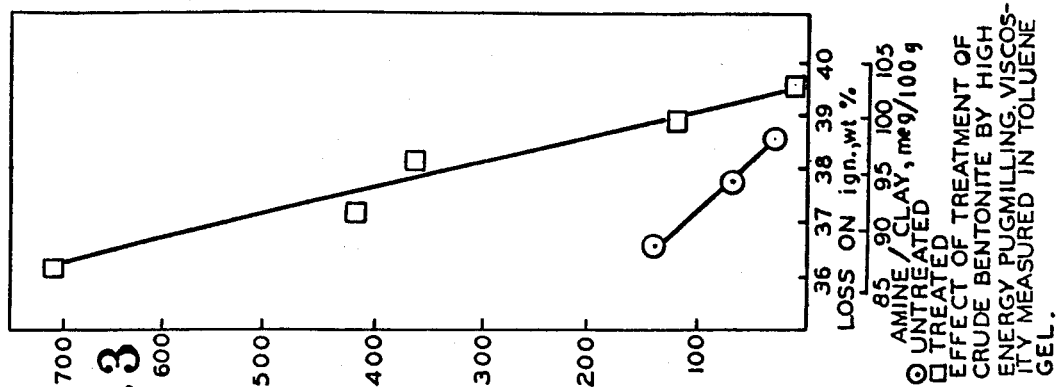
FIG. 3 — EFFECT OF TREATMENT OF CRUDE BENTONITE BY HIGH ENERGY PUGMILLING. VISCOSITY MEASURED IN TOLUENE GEL.
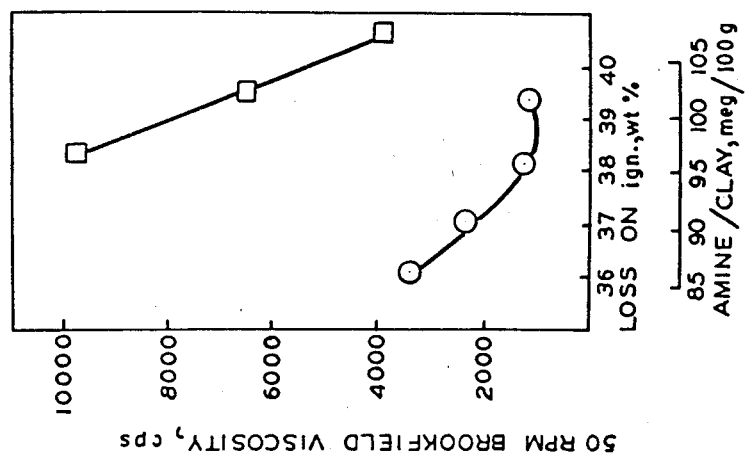
FIG. 2 — EFFECT OF TREATMENT OF CRUDE BENTONITE BY HIGH ENERGY PUGMILLING. VISCOSITY MEASURED IN ODORLESS MINERAL SPIRIT GEL.
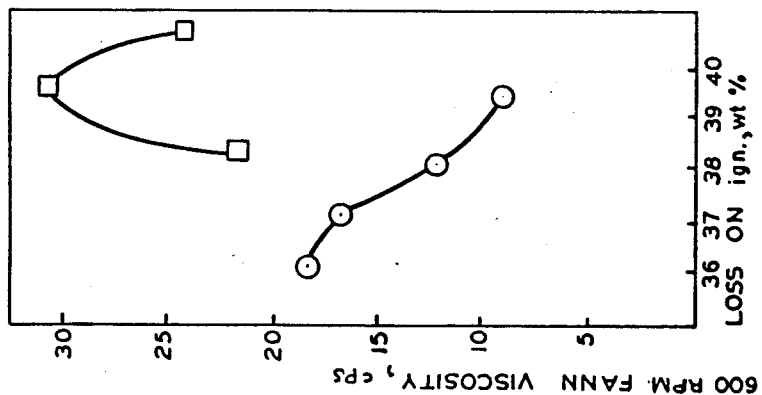
FIG. 1 — EFFECT OF TREATMENT OF CRUDE BENTONITE BY HIGH ENERGY PUGMILLING. VISCOSITY MEASURED IN DIESEL FUEL GEL.

PROCESS FOR MANUFACTURING ORGANOCLAYS HAVING ENHANCED GELLING PROPERTIES

This application is a continuation-in-part of our copending appliation Ser. No. 393,600, filed June 30, 1982, which was a continuation of appliation Ser. No. 193,635, filed Oct. 3, 1980, both of which are now abandoned.

BACKGROUND OF INVENTION

This invention relates generally to organophilic clays (hereinafter referred to as "organoclays"), and more spcifically relates to an improved process for manufacture of same, which process strikingly enhances the gelling properties of the said products.

Organoclays, representing the reaction product of a smectite-type clay with a higher alkyl-containing quaternary ammonium compound, have long been known for use in gelling of organic liquids such as lubricating oils, linseed oil, toluene and the like. A large variety of highly useful products, such as lubricating greases are producible through use of such gelling agents. The procedures and chemical reactions pursuant to which these organoclays are prepared, are well-known. Thus, under appropriate conditions, the organic compound which contains a cation, will react by ion exchange with clays which contain a negative layer lattice and exchangeable cations to form the organoclay products. If the organic cation contains at least one alkyl group containing at least 10 carbon atoms, then the resultant organoclays will have the property of swelling in certain organic liquids.

Among the prior art patents which discuss at length aspects of the preparation and properties of organoclays, as above outlined, are U.S. Pat. Nos. 2,531,427; 2,966,506; 3,974,125; 3,537,994; and 4,081,496. Reference may also be had to applicable portions of the standard reference work "Clay Mineralogy", 2nd Edition, 1968, by Ralph E. Grim, McGraw Hill Book Company.

In the usual procedure for preparing an organiphilic clay pursuant to this prior art, the smectite-type clay, selected, quaternary compound and water are mixed together, peferably at an elevated temperature, typically in the range of 100° F. to 180° F., for a period of time sufficient for the organic quaternary ammonium compound to coat the clay particles. Thereafter, the product can be filtered, washed, dried and ground, or otherwise processed, depending upon intended use. In some instances, e.g., drying and grinding will not be required. Various other modifications of this process may be used depending upon the form of product desired—as will be noted in the referenced patents.

SUMMARY OF INVENTION

Now in accordance with the present invention, it has unexpectedly been discovered that the known process for manufacture of an organoclay, wherein a smectite-type clay is reacted with a higher alkyl-containing quaternary ammonium compound, may be improved to yield striking enhancement of the gelling properties of the resultant organoclay product, by subjecting the clay to high energy pugmilling prior to the said reaction thereof with the ammonium compound. This is preferably effected by extruding the clay at 25 to 40 weight percent moisture content, through a pugmill which imparts at least 20 HP hr/ton of energy to the clay, after which the clay is subjected to the prior art processing.

Cursory reference has been made in U.S. Pat. Nos. 4,081,496 and 4,116,866 to use of a pugmill for shearing an aqueous bentonite-type clay slurry. However, in these products the pugmilling was utilized solely to assist reaction of the clay with a soluble sodium compound.

The high energy pugmilling to which the smectite-type clay is subjected in accordance with the process of this invention, is preferably effected by passing the smectite-type clay through a pugmill of the type disclosed in U.S. Pat. No. 3,574,345. Such device includes a barrel, a motor driven screw mounted in the barrel, and apertured plates at the tapered output end of the barrel from which the material worked in the pugmill is extruded. The said pugmill differs especially from conventional pugmills in having an L/D ratio of from 4:1 to 10:1, where L is the effective length of the screw or auger in the barrel of the pugmill and D is the internal diameter of the portion of the barrel containing the screw.

It is preferable in accordance with the invention, to impart at least 40 to 50 HP per ton of dry clay to the material passing through the pugmill. Higher levels of energy may also be usefully imparted, up to at least 50 HP-hr/ton of dry clay, although this may require multiple passes through the pugmill.

The precise manner in which the high energy pugmilling acts to enable the remarkable improvements yielded by the invention are not precisely understood. Among other things, however, it has been found that such treatment has a marked effect on the average particle size of the clay. It thus has been determined that where a smectite-type clay having an average particle size of 0.475 microns is passed through a pugmill of the type above described, and approximately 30 HP-hr/ton of energy dissipated therein, the average particle size is reduced to 0.391 microns. At energy dissipation levels of 51 and 108 HP-hr/ton (and under otherwise similar conditions) a feed clay having an average particle size of 0.756 microns is so changed that the average particle size is respectively reduced to 0.277 and 0.276 microns. Clearly at the energy range of interest to the invention a vast reduction in average particle size is obtained. (These data are weight average particle size of the bentonite dispersed in water, as measured on a "Nanosizer" apparatus, marketed by Coulter.)

The smectite-type clays which are subjected to the improved process of this invention, are precisely those which have been conventionally utilized in the prior art in the preparation of organoclays as aforementioned. These are smectite-type clays which have a cation exchange capacity of at least 75 milliequivalents per 100 grams of clay. Useful clays for such purposes include the naturally occuring Wyoming variety of swelling bentonite and similar clays, and hectorite, which is a swelling magnesium-lithium silicate clay. The clays are preferably converted to the sodium form if they are not already in this form. This can be effected, again as is known in the art, by a cation exchange reaction, or the clay can be converted via an aqueous reaction with a soluble sodium compound.

Smectite-type clays prepared synthetically can also be utilized, such as montomorillonite, bentonite, beidelite, hectoritesaponite, and stevensite.

In a typical preferred procedure pursuant to the invention, the crude smectite-type clay, as for example a bentonite, is adjusted with water to approximately 60.0 to 75.0% solids. The crude is then passed through the pugmill under conditions which impart at least 40 to 50 HP-hr per ton of dry clay. In the event the crude is not a sodium clay, sodium carbonate may be added during the pugmilling process to produce a sodium bentonite. The clay is then dispersed in water at relatively low solids, typically at less than 10% by weight. The slurry is then screened and centrifuged to remove non-clay components and especially abrasive elements such as quartz. The centrifuge is preferably set to recover a sub-4 micron cut, as is usual in preparing the clay for the organic reaction.

The fine fraction from the centrifuge, which typically includes 4 to 5% solids, is then subjected to the conventional reaction with the quaternary amine.

The reaction of the pugged clay with the amine is effected by the conventional procedures described at great length in the prior art, including in the previously mentioned patents.

The organic compounds which are reacted with the clay are quaternary ammonium salts, where the salt anion is preferably chloride or bromide or mixtures thereof; and is more preferably chloride ion. The salt anion may also, however, be nitrate, hydroxyl, acetate, or mixtures of these. Any of such compounds as are known to be useful in producing organoclay gellants of the type herein discussed may be used in this aspect of the invention, specifically including the compounds so reported useful in the patents heretofore cited. Among others these include dimethyl di(hydrogenated tallow), dimethyl benzyl hydrogenated tallow, dibenzyl dialkyl, methyl benzyl dialkyl, and trimethyl hydrogenated tallow salts.

Pursuant to the improvements yielded by the invention, the gelling characteristics i.e. the gelling efficiency of the clays treated by the invention, are so markedly enhanced, as to make possible use of quantities of the gelling agent to achieve a given result, which are reduced in comparison to the amount which would be required in the absence of the invention. Further clays, such as certain deposits of bentonite-type clays which heretofore had been considered unacceptable as crude materials for use in preparing suitable gellants, are found when treated by the process of the invention, to yield organoclay gelling agents which are fully acceptable for use in gelling organic liquids or the like. A net effect of the invention in this regard, is therefore to enable highly effective use of crude deposits previously deemed usable for these purposes, thereby vastly expanding the possible sources of raw materials which can be used to produce the final gellant products.

BRIEF DESCRIPTION OF DRAWINGS

In the drawings appended hereto:

FIG. 1 is a graph comparing the effects of gelling a diesel fuel with a bentonite slurry prepared by the process of the invention, with a bentonite slurry which has been conventionally processed;

FIG. 2 is a graph similar to FIG. 1 and illustrating the comparative results achieved where an organoclay in accordance with the invention, and a control untreated clay, are each used in the gelling of odorless mineral spirits; and FIG. 3 is a further graph similar to the foregoing graphs, and illustrating comparable data for a toluene gel.

DESCRIPTION OF PREFERRED EMBODIMENTS

The invention will now be illustrated by a series of Examples, which are intended to set forth typical and preferred procedures to be utilized in practice of the process of the invention.

EXAMPLE I

In this Example, the smectite-type clay utilized as a starting material was a Wyoming bentonite. The crude bentonite was adjusted with water to approximately 60 to 75% solids, and was then passed through a pugmill of the type disclosed in the aforementioned U.S. Pat. No. 3,574,345. The mill had an L/D ratio of about 7.5:1. Approximately 40 to 50 HP-hr/ton of dry clay of energy was imparted to the materials. The pugged bentonite was thereupon dispersed in water at 7% solids by weight. The slurry was thereupon screened, and then centrifuged to remove non-clay components, including abrasive elements such as quartz. The fine fraction from the centrifuge, included approximately 4 to 5% solids by weight. The sheared samples, were each divided into further portions, which were reacted with the salt of a dimethyl di(hydrogenated tallow) amine. The ratio of amine to clay was varied in the samples from 85 to 105 milliequivalents per 100 grams of clay on a 100% active clay basis. The amine was stirred into the approximately 4 to 5% solids slurry at 60° C., with stirring being continued for approximately ½ hour, after which the material was filtered, washed with water and dried at 60° C. The dried material was pulverized with a Mikropul mill to approximately 95% less than 200 mesh. Tests were then conducted to determine the gelling properties of each of the invention samples.

In FIG. 1 herein, Fann viscosity in cps is plotted as a function of milliequivalents of the amine added to the clay for untreated bentonite samples, i.e., prior art samples, and for the sample treated in accordance with the invention. (Loss on ignition is also plotted as abscissa, which is a measure of the organics combined with the clay.) The type of bentonite utilized in this example is considered by those skilled in the art to be relatively "good" for use in preparing organoclay gellants. Viscosity measurements were effected by measuring a quantity of diesel oil into a multi-mixer can. In each instance, the sample to be evaluated was added to the diesel oil with stirring, after which water was stirred into the mix, the can removed from the mixer, and placed on the Fann viscometer, and the 600, and 300 rpm readings obtained. Gel readings were obtained after 10 seconds. It will be apparent that a vast improvement in viscosity of the gelled diesel fuel is evidenced across all ranges of the amine-to-clay ratio where the method of the invention is used.

EXAMPLE II

In this instance, the same procedure was utilized as in Example I, except that the effect of the invention on the gellant were evaluated by admixing same with odorless mineral spirits (OMS). In the said procedure, a fixed quantity of the odorless mineral spirits were transferred to a container and the temperature is established for same. A small quantity of 100% propylene carbonate was added to the mixture, while stirring. Next, a specified quantity of the sample to be evaluated was transferred to the container, followed by vigorous stirring. The mixture was blunged with a Cowles blade for two minutes and the gel stirred for 10 revolutions with a spatula. The container was covered and the gel allowed to remain in a constant temperature bath at 24° C., + or −1° C. for two hours, after which the gel viscosity was measured on a Brookfield viscometer. The resulting data is plotted in FIG. 2, and establishes even a more remarkable difference between the treated and untreated organoclays with respect to their ability to gel the said odorless mineral spirits.

EXAMPLE III

In FIG. 3, a similar material to that used in Examples I and II, resulting from the present invention, is evaluated for its gelling characteristics in toluene. In this procedure, 6 grams of the organoclay was admixed with 340 ml of toluene by use of a Waring blender. 2.3 ml of a polar dispersant was then added, consisting of 95% by weight methanol and 5% by weight of deionized water, and additional blending carried out. (In general, small proportions of polar compounds may be added to develop maximum viscosity. Typical polar activators are water, methanol, and propylene carbonate.) The contents were then poured into a container, allowing the gel to flow very thinly over the container lip, thus allowing any air bubbles to escape. The container was maintained in a water bath at 74° + or −1° F., for two hours, after which Brookfield viscosity readings were obtained. Once again, FIG. 3 illustrates the striking improvements yielded by practice of the invention.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. In a process for manufacture of an organoclay by reacting a sodium smectite-type clay with a higher alkyl-containing quaternary ammonium compound; the improvement enabling enhancement of the gelling propertiees of said clay, comprising:
   subjecting the clay to high energy pugmilling prior to the said reaction thereof with said ammonium compound by passing said clay while moist through a pugmill which imparts at least 20 HP-hrs/ton of energy to the moist clay.

2. A method in accordance with claim 1, wherein said pugmilling is effected by passing said clay through said pugmill at 25 to 40 weight percent moisture content.

3. A method in accordance with claim 2, wherein said imparted energy is at least 40 to 50 HP-hr/ton.

4. A method in accordance with claim 3, wherein the said pugmill has an L/D ratio of from about 4:1 to 10:1.

5. A process for the manufacture of an organoclay gellant from a crude smectite-type clay considered unacceptable for use in preparing such organoclay, which comprises subjecting the smectite-type clay considered unacceptable to high energy pugmilling by passing said clay while moist through a pugmill which imparts at least 20 Hp-hrs/ton of energy to the moist clay, and then reacting said pugmilled clay in its sodium form with a higher alkyl-containing quaternary ammonium compound.

6. A method in accordance with claim 5, wherein said clay is passed through said pugmill at 25 to 40 weight percent moisture content.

7. A method in accordance with claim 6, wherein said imparted energy by said pugmill is at least 40 to 50 Hp-hr/ton.

* * * * *